United States Patent
Hou (10) Patent No.: US 12,418,697 B2
(45) Date of Patent: Sep. 16, 2025

(54) METHODS AND SYSTEMS FOR CONTROLLING STREAMING CONTENT ASPECT RATIOS

(71) Applicant: Pluto Inc., West Hollywood, CA (US)

(72) Inventor: Vibol C. Hou, Long Beach, CA (US)

(73) Assignee: Pluto Inc., West Hollywood, CA (US)

( * ) Notice: Subject to any disclaimer, the term of this patent is extended or adjusted under 35 U.S.C. 154(b) by 142 days.

(21) Appl. No.: 18/458,097

(22) Filed: Aug. 29, 2023

(65) Prior Publication Data
US 2025/0080799 A1   Mar. 6, 2025

(51) Int. Cl.
*H04N 21/4402* (2011.01)
*H04N 21/61* (2011.01)

(52) U.S. Cl.
CPC . *H04N 21/440272* (2013.01); *H04N 21/6125* (2013.01)

(58) Field of Classification Search
CPC .............. H04N 21/440272; H04N 21/6125
See application file for complete search history.

(56) References Cited

U.S. PATENT DOCUMENTS

| | | | |
|---|---|---|---|
| 2010/0053442 A1* | 3/2010 | Kudo | H04N 21/4828 348/581 |
| 2011/0181783 A1 | 7/2011 | Kudo | |
| 2013/0219425 A1 | 8/2013 | Swartz | |
| 2016/0182923 A1* | 6/2016 | Higgs | H04H 20/106 725/34 |
| 2017/0295410 A1 | 10/2017 | Bloch et al. | |
| 2018/0014049 A1 | 1/2018 | Griffin et al. | |
| 2018/0227344 A1 | 8/2018 | Troxler et al. | |
| 2018/0316947 A1 | 11/2018 | Todd | |
| 2020/0092590 A1* | 3/2020 | Carpenter | G06N 20/00 |
| 2020/0206613 A1 | 7/2020 | Perlman et al. | |
| 2020/0396451 A1 | 12/2020 | Soroushian et al. | |
| 2022/0007066 A1 | 1/2022 | Carpenter | |
| 2024/0205497 A1* | 6/2024 | Zhu | G06F 1/1694 |

FOREIGN PATENT DOCUMENTS

EP    3 235 252 B1    2/2020

OTHER PUBLICATIONS

Extended European Search Report, dated Oct. 2, 2024, regarding Application No./Patent No. 24176234.3, 12 pages.

\* cited by examiner

*Primary Examiner* — Nicholas T Corbo
(74) *Attorney, Agent, or Firm* — Knobbe, Martens, Olson & Bear LLP (57) ABSTRACT

An aspect of the present disclosure relates to methods and systems configured to control video content rendering on a user device. After primary streaming content has been rendered on the user device using a first aspect ratio, streaming of secondary content to the user device is detected. The first aspect ratio is automatically changed to a second aspect ratio in response to detecting the streaming of secondary content, wherein the second aspect ratio is configured to enable frames of the secondary content to be fully rendered on the user device, wherein tops, bottoms, and sides of the secondary content are not cut off or obscured. An end of the streaming of the secondary content is detected, and at least partly in response to detecting the end of the streaming of the secondary content, the first aspect ratio is restored.

22 Claims, 4 Drawing Sheets

METHODS AND SYSTEMS FOR CONTROLLING STREAMING CONTENT ASPECT RATIOS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field

The present disclosure is related to video content rendering.

Description of the Related Art

Streaming media has become an important mechanism for delivering video content to users. However, the vast number of different display devices and of content aspect ratios may cause streamed content to be displayed with the top, bottom, left side, and/or right side to be cut off.

While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

The present disclosure describes systems and processes that overcome the above described technical problems as well as the drawbacks of conventional approaches to rendering content on user devices. It is understood that the various aspects disclosed herein may be utilized together (e.g., via common system(s)) or separately.

An aspect of the present disclosure relates to dynamically modifying a zoom level when rendering content, such as video content, to ensure that the content is fully displayable on the rendering device.

Optionally, processes disclosed herein may be performed by one or more backend server systems (e.g., a content streaming system), a user device hosting a streaming application or the like, and/or partially by backend server systems and partially by a streaming application hosted on a user device.

As discussed herein, streaming media has become an important mechanism for delivering video content to users. However, given the vast number of different display devices and of content aspect ratios, the aspect ratio used to render a given content item on a given user device, may conventionally, not be appropriate and may cause streamed content to be displayed with the top, bottom, left side, and/or right side cut off/obscured. This is particularly true when an item of video content comprises content being streamed from different sources or that comprises primary content and interstitial/secondary content (e.g., a public service announcement, an advertisement, or the like) having different aspect ratios.

Not only does this conventional content rendering process provide a poor user experience, but it may also require a user to manually modify the video content aspect ratio/playback mode via a finger gesture or the like in order to view such cut-off content. However, in addition to the inconvenience of such manual user intervention, by the time the user has manually modified the aspect ratio, the user is likely to have missed certain portions of the video content that had been cut off/obscured.

By way of further example, a video stream may be rendered on a user device (e.g., a mobile phone, tablet, game console, networked television, etc.), with a stream for the primary content in a letter box mode, while a stream for secondary content (e.g., between two segments of primary content or between two primary content programs) may be in a full screen "zoom" mode. Due to a mismatch between the user device display and the aspect ratio of the secondary content in full screen "zoom" mode, portions (e.g., a top portion, bottom portion, left portion, and/or right portion) of the secondary content will be occluded/cut off so they will not be visible to the user.

As will be described, the beginning of a segment of secondary content may be detected. For example, a process being executed by a system or user device discussed herein may detect embedded tags in the secondary content stream, such as ID3 embedded tags that enables the beginning of an ad or ad-pod to be detected, or SCTE-35 signals (e.g., a splice event ID), that mark the beginning of an ad or ad-pod (a group of sequential video ads that are played together during a single advertising break). SCTE-35 is a standard developed by the Society of Cable Telecommunications Engineers (SCTE). ID3 provides information about each individual ad within the pod, its duration, and other relevant metadata. In addition or instead, scheduling information stored in memory (e.g., that specifies when an item of primary content is scheduled to start, insertion times/start times for individual ads or ad-pods to be inserted within the primary content, and/or the like) may be used to identify the start of an ad or ad-pod. At least partly in response to determining the beginning of an ad-pod, the aspect ratio may be adjusted (e.g., by causing an un-zoom/zoom out operation to be performed) so as to cause the entire secondary content frames to be rendered for the duration of the ad-pod. For example, the un-zoom command may be equivalent to a tap command on playing video. The un-zoom command may be transmitted to a software video player on a user's mobile phone or other device, or the video player may, upon detecting the beginning of an item of secondary content, automatically perform an un-zoom/zoom out operation. Information identifying the aspect ratio/playback mode being used prior to the issuing of the un-zoom command may be stored in memory and may be used to later restore that aspect ratio/playback mode.

Similarly, the embedded tags in the secondary content stream, such as ID3 embedded tags or SCTE-35 signals (e.g., a splice event ID, such as the same one used to indicate the start of an ad-pod), may be utilized to indicate the end of an ad or ad-pod. In addition or instead, scheduling information stored in memory (e.g., that specifies when an item of primary content is scheduled to start, insertion times/start times for ad-pods to be inserted within the primary content, and/or the like) may be used to identify the end of secondary content, such as an ad or ad-pod. For example, within an ID3-compliant video stream, each individual ad may be accompanied by metadata provided in the ID3 template. This metadata includes information about the ad's duration, tracking URLs, and other attributes. If a series of ads is meant to be played together as an ad-pod, the ID3 metadata for each ad within the pod can include information that enables the video player, the streaming system, and ad-serving system to recognize the sequence of ads that make up the pod. The ID3 metadata for the ads within the pod can include the total duration of the ad pod. This information enables the video player and/or content composer and content transmission system to anticipate when the ad pod is expected to end and/or to detect that it has ended. The tracking URLs provided in the ID3 metadata can be used to monitor the progress of the ads and the ad pod. By monitoring such data and progress, the system and/or video player can determine when the last ad in the ad pod has been played. For example, when the combined duration of the ads matches the expected duration of the ad pod, the system and/or video player can interpret this as the end of the ad-pod.

In response to determining that the secondary content has completed playing (e.g., the last ad in the ad pod has been played (or it there is a single ad, in response to determining the ad has been played)), the aspect ratio/playback mode being used prior to the issuing of the un-zoom command may optionally be accessed from memory. Optionally instead, a default aspect ratio/playback mode may be accessed. The process may then use the retrieved aspect ratio/playback mode or default aspect ratio or default playback mode to command the video player on the user device to perform a zoom operation (or other operation) so as to restore the aspect ratio/playback mode (e.g., a letterbox mode) to that being used prior to the issuing of the un-zoom command.

Figure 1:
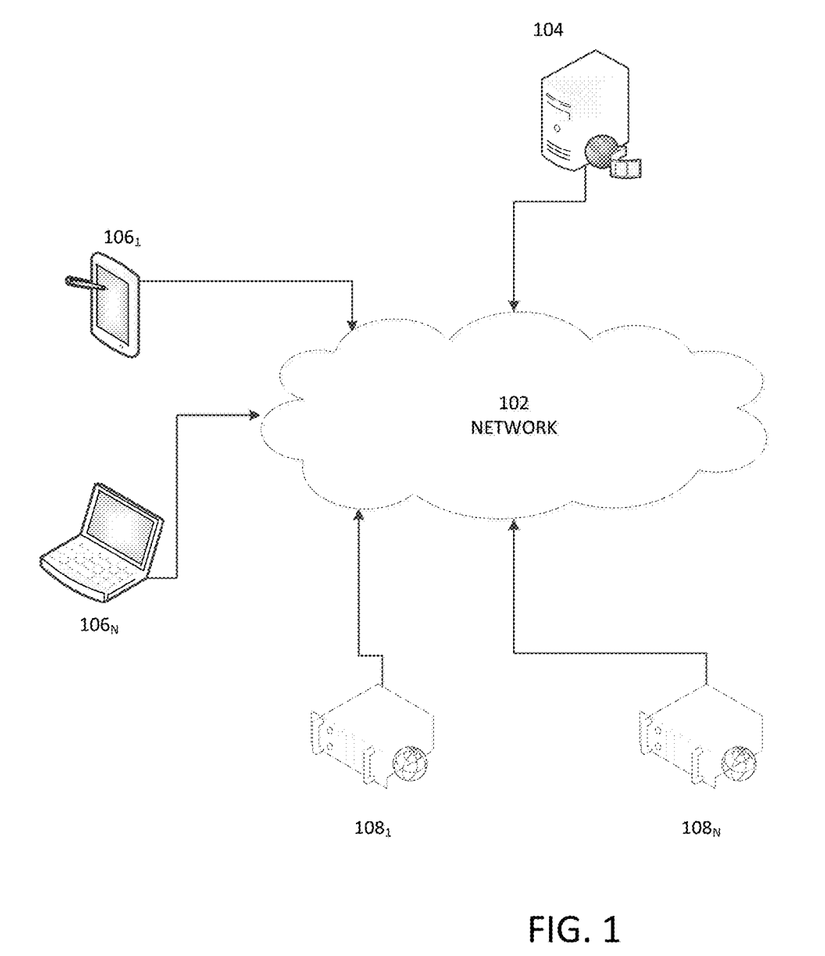
FIG. 1 illustrates an example environment.

Certain example aspects will now be discussed with reference to the figures. FIG. 1 illustrates an example environment. A content composer and content transmission system 104 (which may include a stitcher component, such as a server providing stitcher services or where a stitcher system may include a content composer component, or where the content composer and the stitcher may be independent systems) is connected to a network 102 (e.g., a wide area network, the Internet, a local area network, or other network). The content composer and content transmission system 104 is configured to communicate with client devices 1061 . . . 106$_n$ (e.g., connected televisions, smart phones, laptops, desktops, game consoles, streaming devices that connect to televisions or computers, etc.) that comprise video players. By way of example, the video player may be embedded in a webpage, may be a dedicated video player application, may be part of a larger app (e.g., video streaming application configured to display electronic program guides, a game application, a word processing application, etc.), may be hosted by a connected television (CTV), or the like. The system 104 may be configured to provide video-on-demand (VOD) streaming content, linear, time-scheduled streaming video content, and/or downloadable video content.

For example, the content composer and content transmission system 104 may receive a request for media from a given client device 106 in the form of a request for a playlist manifest or updates to a playlist manifest. The content composer and content transmission system 104 may optionally determine if secondary content (which may comprise interstitial content) is to be inserted in an item of primary content (e.g., a movie, a television show, a sporting event, etc.). If secondary content (e.g., an advertisement, public service announcement, preview of an upcoming program, station identification, etc., which may be in the form of interstitial content) is to be inserted in an item of primary content, a file may be accessed indicating the location and length of a secondary content pod (e.g., a time frame reserved for interstitials, wherein one or more interstitials may be needed to fill a pod), the system 104 may determine context information (e.g., information regarding the primary content being requested, information regarding the user, and/or other context information), solicit and select secondary content from third parties, define customized secondary content, generate playlist manifests, and/or perform other functions described herein.

The content composer and content transmission system 104 and/or another system may stream requested content to the requesting client device 106. For example, the content composer and content transmission system 104 may stream content to a client device 106 in response to a request from the client device 106 made using a playlist manifest entry, or the content composer and content transmission system 104 may stream content to a client device 106 in a push manner (in the absence of a client device request). Thus, the assembly of video clips into a program or other integrated item of content may be performed on the client side by assembling a set of separate video clips accessed via a manifest. Optionally, the assembly of video clips into a program or other integrated item of content may be performed on the server-side, which may pre-stitch a plurality of clips into a single item of content, and then push the single item of content to a user device via a single video stream URL.

As discussed elsewhere herein, the integrated item of content may include content having different aspect ratios. For example, the primary content may be in letterbox mode (where letterboxes can crop footage shot in 16:9 to a more cinematic 2.35:1) and the secondary content may have a full screen zoom aspect ratio (e.g., 4:3 or 16:9).

Optionally, the content composer and content transmission system 104 may transmit context information to one or more secondary content source systems 108$_1$ . . . 108$_n$. For example, the source systems 108$_1$ . . . 108$_n$ may optionally include ad servers, and the secondary content may comprise ads. The secondary conte source systems 108$_1$ . . . 108$_n$ may comply with the VAST protocol. By way of further example, the secondary content source systems 108$_1$ . . . 108$_n$ may provide public service videos, previews of upcoming programs, quizzes, news, games, and/or other content. The secondary content source systems 108$_1$ . . . 108$_n$ may use the context information in determining what secondary content (if any) is to be provided or offered to the requesting client device 106.

The content composer and content transmission system 104 may provide video content on a video-on-demand (VOD) basis to client devices 106. For example, the content composer and content transmission system 104 may provide and/or populate user interfaces presenting representations of a library of content items via a user device 106, where the user may select a given content item and the selected content item will be substantially immediately streamed to the user device as video-on-demand content.

The content composer and content transmission system 104 may, in addition, provide linear scheduled video content via one or more channels (e.g., themed channels) according to a program schedule, where a given program may have a scheduled start time and end time. For example, a user interface of a program guide may be presented on a user device 106, the program guide listing channels and the start and end times of programs of a given channel over a period of time (e.g., the current time and for a period of 2 or 3 hours thereafter, where the user may be enabled to scroll further forward through the program guide). The user may select a channel (or a program associated with a channel) via the program guide, and the currently scheduled program (and associated secondary content) for that channel will be streamed to the user device at its current scheduled playback position.

The content composer and content transmission system 104 and/or the video player may be configured to determine when the beginning of an item of secondary content or a sequence of items of secondary content (e.g., an ad-pod) begins and ends as similarly discussed elsewhere herein. In response to detection of the beginning of the secondary content, the current state of the aspect ratio/zoom may be stored in memory and the video player may un-zoom the video playback. Then, in response to detection of the end of the secondary content (e.g., the end of a single ad or an ad pod), the previous state of the aspect ratio/zoom may be accessed from memory and the video player may zoom the video playback back to the original aspect ratio (or a default aspect ratio may be used).

Figure 2A:
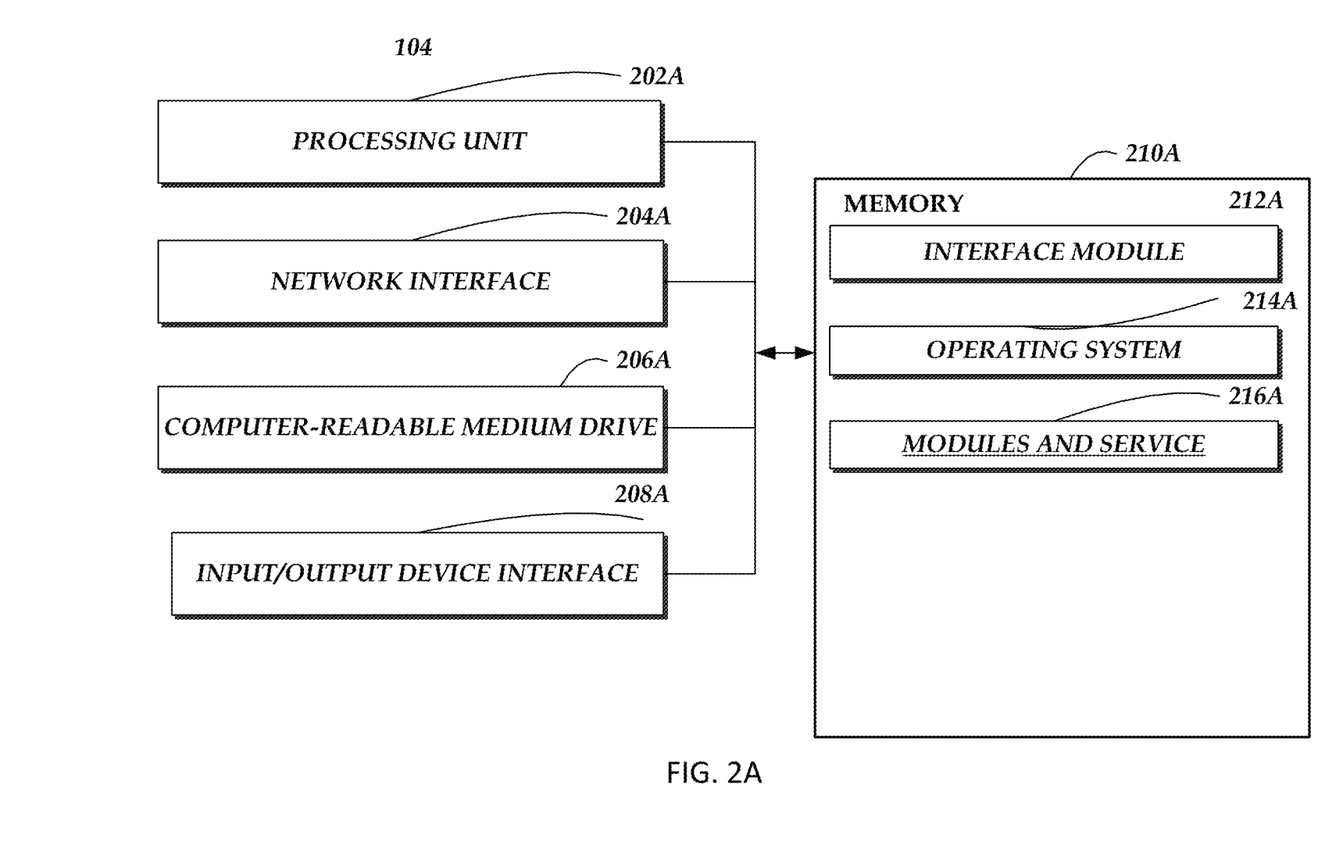
FIG. 2A is a block diagram illustrating example components of a content composer and streaming system.

FIG. 2A is a block diagram illustrating example components of a content composer and content transmission system 104. The example content composer and content transmission system 104 includes an arrangement of computer hardware and software components that may be used to implement aspects of the present disclosure. Those skilled in the art will appreciate that the example components may include more (or fewer) components than those depicted in FIG. 2A. The composer and content transmission system 104 may optionally be a cloud-based system including a hosted computing environment that includes a collection of physical computing resources that may be remotely accessible and may be rapidly provisioned as needed. Further, the composer and content transmission system 104 may include or utilize a hosted storage environment that includes a collection of physical data storage devices that may be remotely accessible and may be rapidly provisioned as needed (sometimes referred to as "cloud" storage). Such cloud storage may be utilized to store some, or all of the data, programs, and content described herein.

The content composer and content transmission system 104 may include one or more processing units 202A (e.g., a general purpose processor, an encryption processor, a video transcoder, and/or a high speed graphics processor), one or more network interfaces 204A, a non-transitory computer-readable medium drive 206A, and an input/output device interface 208A, all of which may communicate with one another by way of one or more communication buses. The network interface 204A may provide the various services described herein with connectivity to one or more networks (e.g., the Internet, local area networks, wide area networks, personal area networks, etc.) and/or computing systems (e.g., secondary content source systems, client devices, etc.). The processing unit 202A may thus receive information, content, and instructions from other computing devices, systems, or services via a network, and may provide information, content (e.g., streaming video content, content item previews, etc.), and instructions to other computing devices, systems, or services via a network. The processing unit 202A may also communicate to and from non-transitory computer-readable medium drive 206A and memory 210A and further provide output information via the input/output device interface 208A. The input/output device interface 208A may also accept input from various input devices, such as a keyboard, mouse, digital pen, touch screen, microphone, camera, etc.

The memory 210A may contain computer program instructions that the processing unit 202A may execute to implement one or more aspects of the present disclosure. The memory 210A generally includes RAM, ROM and/or other persistent or non-transitory computer-readable storage media. The memory 210A may include cloud storage. The memory 210A may store an operating system 214A that provides computer program instructions for use by the processing unit 202A in the general administration and operation of the modules and services 216A, including its components. The modules and services 216A are further discussed with respect to FIG. 2B and elsewhere herein. The memory 210A may further include other information for implementing aspects of the present disclosure.

The memory 210A may include an interface module 212A. The interface module 212A can be configured to facilitate generating one or more interfaces through which a compatible computing device may send to, or receive from, the modules and services 216A.

Figure 2B:
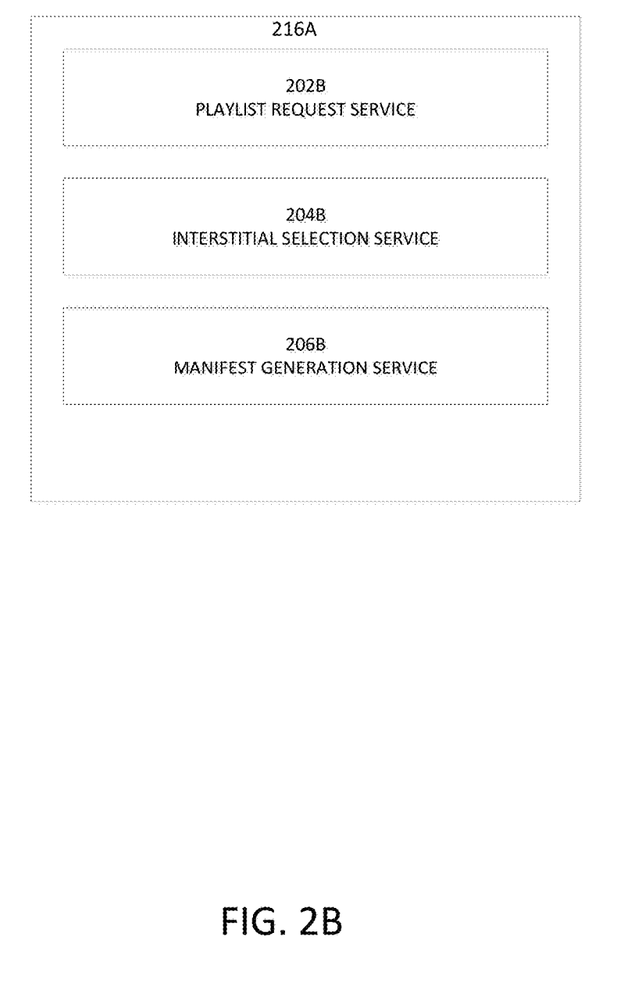
FIG. 2B illustrates example modules and services of the content composer and streaming system.

The modules or components described above may also include additional modules or may be implemented by computing devices that may not be depicted in FIGS. 2A and 2B. For example, although the interface module 212A and the modules and services 216A are identified in FIG. 2B as single modules, the modules may be implemented by two or more modules and in a distributed manner. By way of further example, the processing unit 202A may optionally include a general purpose processor and may optionally include a video codec. The system 104 may offload certain compute-intensive portions of the modules and services 216A (e.g., transcoding and/or transrating a stream for adaptive bitrate operations, compositing, and/or the like) to one or more dedicated devices, such as a video codec (e.g., H.264 encoders and decoders), while other code may run on a general purpose processor. The system 104 may optionally be configured to support multiple streaming protocols, may provide low latency pass-through, and may support a large number of parallel streams (e.g., HD, 4K, and/or 8K streams). The processing unit 202A may include hundreds or thousands of core processors configured to process tasks in parallel. A GPU may include high speed memory dedicated for graphics processing tasks. As another example, the system 104 and its components can be implemented by network servers, application servers, database servers, combinations of the same, and/or the like, configured to facilitate data transmission to and from data stores, user terminals, and third party systems via one or more networks. Accordingly, the depictions of the modules are illustrative in nature.

Referring to FIG. 2B the modules and services 216A may include modules that provide a playlist request service 202B, an interstitial selection service 204B, and a playlist manifest generation service 206B.

The playlist request service 202B may receive and process requests for playlist manifests from user device clients (e.g., video players). The secondary content selection service 204B may assemble content information for a given secondary content pod (e.g., the length of the secondary content pod, the subject matter of requested primary content, information regarding a channel the viewer is watching, the content of a scene in which the secondary content pod is located, etc.) and transmit the information to one or more secondary content source systems (e.g., secondary content source systems $108_1 \ldots 108_n$). The secondary content source systems may propose secondary content to the secondary content selection service 204B of the stitcher system. The secondary content selection service 204B may evaluate the proposals (e.g., based on secondary content subject, the proposal source, associated bid amounts, etc.) and select one or more items of interstitial content for inclusion in the secondary content pod.

The manifest generation service 206B may be used to assemble a playlist manifest (e.g., an HLS or MPEG DASH manifest) including locators (e.g., URLs) pointing to segments of primary and secondary content and locators (e.g., URLs).

For example, a user device client (e.g., a video player, such as may be provided by or via a mobile phone) may transmit a request for content in the form of a request for a playlist manifest (e.g., a static HLS .m3u8 or an MPEG DASH .mpd manifest file). The request may be for an item of primary content, such as a movie or episode. The request or other communication may identify user device characteristics such as device manufacturer, device model, display size (e.g., display height and width in pixels), device height/width ratio, device operating system, and/or other information.

The request for an item of content (and hence the playlist manifest) may have been triggered by the user manually clicking on a play control or other control, or the request may have been automatically issued by an application or webpage executing on the user device. For example, if the user has completed playing a first movie (or other content, such as a program episode), an application on the user device may automatically request a playlist manifest for the next scheduled movie (or other item of content).

The next scheduled item of contents may be scheduled in accordance with a program guide, where the program guide may include multiple channels (e.g., corresponding to different subject matters), where a given channel has associated programs (e.g., movies or other items of content) with scheduled start and end times. Thus, for example, a playlist manifest for a program may be automatically requested based at least in part on a comparison of the current time and the scheduled starting time for the item of content. If the difference between the current time and the scheduled starting time satisfies a threshold (which could be 0 seconds, or some larger number (e.g., 0.5, 1, or 2 seconds) to enable buffering of the program prior to the start time), the corresponding playlist manifest may be automatically requested and provided to the stitcher system.

The request from the video player on the user device for a playlist manifest may be received over a network (e.g., a wired or wireless network) by a stitcher system. The location and length of secondary content pods within the requested primary content may be identified. For example, a file or other metadata associated with the primary content may be accessed that indicates the positions within the primary content for secondary content pods, wherein a given secondary content pod may have a specified length (e.g., 15 seconds, 30 seconds, 1 minute, 2 minutes, or other length). The stitcher system may construct the requested playlist manifest, with locators (e.g., URLs) for the primary content.

For example, the manifest file may be an HLS .m3u8 or an MPEG DASH .mpd static manifest file. The manifest file may include locators (URLs) for each primary content and secondary content segments or pods in the desired playback order. The manifest file may include the entire playlist for the requested content. The manifest file may include, in the appropriate sequence location, decryption key locators (e.g., URLs), which may be identified using tags, and an encryption type may be identified. For example, an EXT-X-KEY tag may optionally be used to identify encrypted content.

The playlist manifest may be transmitted by the stitcher system to the video player on the user device which is received by the video player on the user device.

The video player on the user device may begin requesting content in the order defined by the playlist manifest. For example, if the initial entry in the playlist manifest is a URL for a segment of primary content, then the user device video player will access, using the primary content segment URL, the primary content segment from the primary content source. If the requested content is encrypted, the user device video player may request a decryption key (e.g., via a decryption key URL included in the playlist manifest).

The user video player receives and plays back the streaming primary content segment, which is rendered on a display. If the primary content is encrypted, the video player may receive and use the decryption key to decrypt the primary content segment. Optionally, the content source may make a determination as to whether the primary content has already been segmented in a form compatible with the requested user device. Different transcoding may need to be performed for different user devices and different user device display sizes (e.g., 10.1 inch tablet display, 5.4 inch phone display, etc.). Thus, the content source may perform content segmentation and/or transcoding based on the user device, or provide previously segmented or transcoded content suitable for the user device. The foregoing process may be repeated for multiple primary content segments in the playlist manifest. The primary content may be in a letterbox aspect ratio to ensure that the full frame is rendered on the user device, although there may be black bars above and beneath the primary video content.

If a content item in the playlist is for secondary (e.g., interstitial content), the secondary content may be streamed for playback by the user device video player (e.g., by the composer and content transmission system discussed elsewhere herein, by an ad server, or other source). The secondary content may be in a full screen zoom aspect ratio. In order to ensure that the frames of the secondary content are fully visible while played back by the user device, the example process illustrated in FIG. 3 may be performed (e.g., by the composer and content transmission system discussed elsewhere herein, by the video player on the user device, partly by the composer and content transmission system and partly by the video player on the user device, in whole or in part by other systems disclosed herein, etc.).

Figure 3:
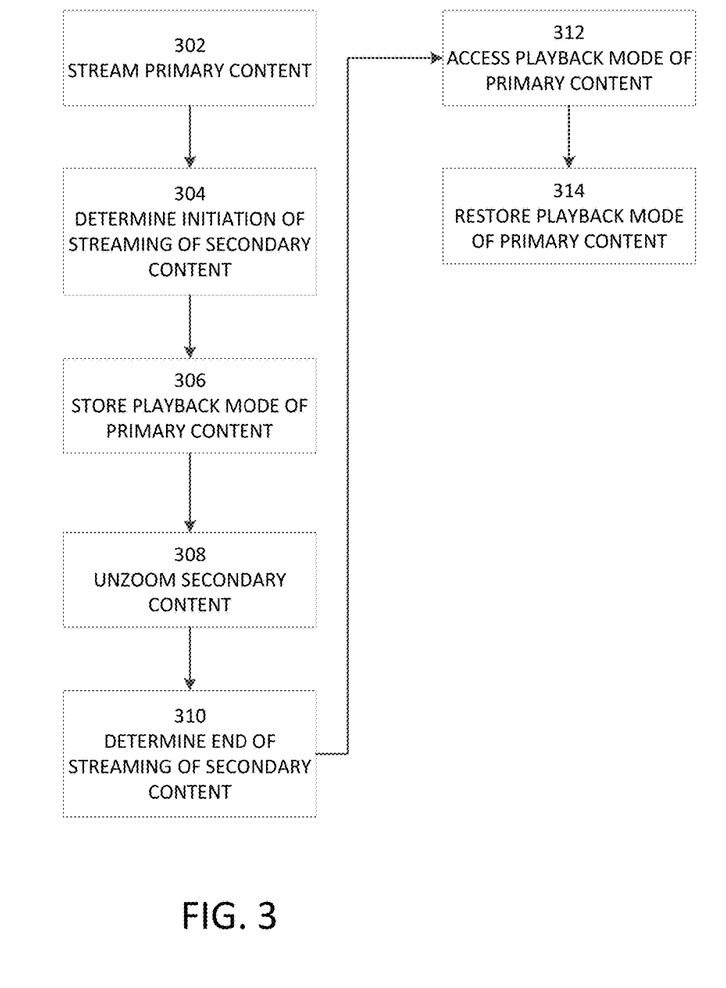
FIG. 3 illustrates an example process for the automated, dynamic control of video playback aspect ratios.

FIG. 3 illustrates an example process for the automated, dynamic control of video playback aspect ratios.

At block 302, primary content is streamed to the user device. The primary content may be displayed in a first aspect ratio (e.g., in a letterbox aspect ratio 2.35:1) so that all of the primary content frames may be viewed on the user device display, without having top, bottom, left, or right sides cut off or obscured.

At block 304, a determination is made (e.g., by the composer and content transmission system and/or the user device video player) that the streaming of secondary content (e.g., interstitial content) has or is about to begin. As similarly discussed elsewhere herein, the determination may be made based on a signal in the stream and/or on known scheduling data regarding when the secondary media is scheduled to begin playing. For example, the process may detect embedded tags, such as ID3 embedded tags that enable the beginning of an ad or ad-pod to be determined or SCTE-35 signals (e.g., a splice event ID), that mark the beginning of an ad or ad-pod. In addition or instead, scheduling information stored in memory (e.g., that specifies when an item of primary content is scheduled to start, insertion times/start times for individual ads or ad-pods to be inserted within the primary content, and/or the like) may be used to identify the start of an item of secondary content or a secondary content pod (e.g., an ad or ad-pod).

At block 306, the playback mode (e.g., the aspect ratio) used during the playback of the primary may optionally be stored in memory.

At block 308, the process (e.g., via the composer and content transmission system and/or the video player) may adjust the play back aspect ratio (e.g., perform an un-zoom operation) to enable the entire frames of secondary content rendered via the user device video player to be visible without obstruction/cut off on the user device display for the duration of the secondary content or secondary content pod. Optionally, the un-zoom command may be transmitted to the software video player on a user's mobile phone by the content composer and content transmission system.

At block 310, a determination is made (e.g., by the composer and content transmission system and/or the user device video player) that the streaming of secondary content (e.g., interstitial content) has or is about to end. For example, the embedded tags, such as ID3 imbedded tags or SCTE-35 signals (e.g., a splice event ID, such as the same one used to indicate the start of an ad-pod), may be utilized to indicate the end of an ad or ad-pod. In addition or instead, scheduling information stored in memory (e.g., that specifies when an item of primary content is scheduled to start, insertion times for individual ads or ad-pods to be inserted within the primary content, ad or ad-pod lengths, scheduled ad or ad-pod end times, and/or the like) may be used to identify the end of an ad or ad-pod. For example, as similarly discussed elsewhere herein, within an ID3-compliant video stream, a given individual ad may be accompanied by metadata provided in the ID3 template. This metadata may include information about the ad's duration, tracking URLs, and other attributes. If a series of ads is meant to be played together as an ad-pod, the ID3 metadata for each ad within the pod can include information that enables the video player and ad-serving system recognize the sequence of ads that make up the pod. The ID3 metadata for the ads within the pod can include the total duration of the ad pod. This information that enables the video player to anticipate/detect when the ad pod is expected to end. The tracking URLs provided in the ID3 metadata can be used to monitor the progress of the ads and the ad pod. As each ad is played, tracking events can be triggered. By monitoring these events, the system and/or video player can determine when the last ad in the ad pod has been played. For example, when the combined duration of the ads matches the expected duration of the ad pod, the system and/or video player can interpret this as the end of the ad-pod.

At block 312, in response to determining that the last secondary content item (e.g., ad in the ad pod) has been played (or it there is a single item of secondary content, in response to determining the item of secondary content has been played), the aspect ratio/playback mode being used prior to the issuing of the un-zoom command may optionally be accessed from memory. Optionally instead, a default aspect ratio/playback mode may be accessed.

At block 314, the retrieved aspect ratio/playback mode or default aspect ratio or default playback mode may be used to command the video player on the user device to perform a zoom operation to restore the aspect ratio/playback mode (e.g., a letterbox mode) to that being used prior to the issuing of the un-zoom command.

Thus, as described herein, systems and methods are disclosed that overcome the technical problems related to rendering content of different aspect ratios on a user device.

An aspect of the present disclosure relates to methods and systems configured to control video content rendering on a user device. After primary streaming content has been rendered on the user device using a first aspect ratio, streaming of secondary content to the user device is detected. The first aspect ratio is automatically changed to a second aspect ratio in response to detecting the streaming of secondary content, wherein the second aspect ratio is configured to enable frames of the secondary content to be fully rendered on the user device, wherein tops, bottoms, and sides of the secondary content are not cut off or obscured. An end of the streaming of the secondary content is detected, and at least partly in response to detecting the end of the streaming of the secondary content, the first aspect ratio is used.

An aspect of the present disclosure relates to a system configured to provide distribution of video content over a network, the system comprising: a computer device; a network interface; non-transitory computer readable memory having program instructions stored thereon that when executed by the computer device cause the system to perform operations comprising: detect, after primary streaming content has been rendered on a user device using a first aspect ratio, streaming of secondary content to the user device; automatically cause the first aspect ratio to be changed to a second aspect ratio at least partly in response to detecting the streaming of secondary content, wherein the second aspect ratio is configured to enable frames of the secondary content to be fully rendered on the user device, wherein tops, bottoms, and sides of the secondary content are not cut off or obscured; detect an end of the streaming of the secondary content; and at least partly in response to detecting the end of the streaming of the secondary content, cause the first aspect ratio to be restored.

Optionally, wherein detecting, after primary streaming content has been rendered on a user device using the first aspect ratio, streaming of secondary content to the user device, comprises detecting ID3 data associated with the streamed secondary content. Optionally, detecting, after primary streaming content has been rendered on a user device using the first aspect ratio, streaming of secondary content to the user device, comprises detecting a SCTE-35 signal associated with the streamed secondary content. Optionally, detecting, after primary streaming content has been rendered on a user device using the first aspect ratio, streaming of secondary content to the user device, comprises accessing timing information associated with the streamed secondary content. Optionally, automatically causing the first aspect ratio to be changed to the second aspect ratio at least partly in response to detecting the streaming of secondary content comprises performing an un-zoom operation. Optionally, the primary streaming content is streamed from a different server then the secondary streaming content. Optionally, restoring the first aspect ratio further comprises accessing information identifying the first aspect ratio from memory. Optionally, the secondary streaming content comprises a sequence of items of item of secondary streaming content.

An aspect of the present disclosure relates to a computer implemented method, the method comprising: detecting, after primary streaming content has been rendered on a user device using a first aspect ratio, a streaming event of secondary content to the user device; enabling the first aspect ratio to be changed to a second aspect ratio at least partly in response to detecting the streaming event of secondary content to the user device, wherein the second aspect ratio is configured to enable frames of the secondary content to be fully rendered on the user device; detecting an end of the streaming of the secondary content; and at least partly in response to detecting the end of the streaming of the secondary content, enabling the first aspect ratio to be restored.

Optionally, detecting, after primary streaming content has been rendered on a user device using the first aspect ratio, the streaming event of secondary content to the user device, comprises detecting ID3 data associated with the streamed secondary content. Optionally, detecting, after primary streaming content has been rendered on a user device using the first aspect ratio, the streaming event of secondary content to the user device, comprises detecting a SCTE-35 signal associated with the streamed secondary content. Optionally, detecting, after primary streaming content has been rendered on a user device using the first aspect ratio, the streaming event of secondary content to the user device, comprises accessing timing information associated with the streamed secondary content. Optionally, changing from the first aspect ratio to the second aspect ratio comprises performing an un-zoom operation. Optionally, the primary streaming content is streamed from a different source then the secondary streaming content. Optionally, enabling restoring the first aspect ratio further comprises accessing information identifying the first aspect ratio using data accessed from memory.

An aspect of the present disclosure relates to a non-transitory computer readable memory having program instructions stored thereon that when executed by a computing device cause the computing device to perform operations comprising: detect, after primary streaming content has been rendered on a user device using a first aspect ratio, a streaming event of secondary content with respect to the user device; enable the first aspect ratio to be changed to a second aspect ratio at least partly in response to detecting the streaming event of secondary content to the user device, wherein the second aspect ratio is configured to enable frames of the secondary content to be fully rendered on the user device; detect an end event of the streaming of the secondary content; and at least partly in response to detecting the end event of the streaming of the secondary content, enable the first aspect ratio to be restored.

Optionally, detecting, after primary streaming content has been rendered on a user device using the first aspect ratio, the streaming event of secondary content to the user device, comprises detecting ID3 data associated with the streamed secondary content. Optionally, detecting, after primary streaming content has been rendered on a user device using the first aspect ratio, the streaming event of secondary content to the user device, comprises detecting an SCTE-35 signal associated with the streamed secondary content. Optionally, detecting, after primary streaming content has been rendered on a user device using the first aspect ratio, the streaming event of secondary content to the user device, comprises accessing scheduling information associated with the streamed secondary content. Optionally, changing from the first aspect ratio to the second aspect ratio comprises performing an un-zoom operation. Optionally, the primary streaming content is streamed from a different source then the secondary streaming content. Optionally, enabling restoring the first aspect ratio further comprises accessing information identifying the first aspect ratio using data accessed from memory.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop-down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc. While the above detailed description has shown, described, and pointed out novel features as applied to various embodiments, it can be understood that various omissions, substitutions, and changes in the form and details of the systems, devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system configured to stream video content over a network, the system comprising:
    a computer device;
    a network interface;
    a non-transitory computer readable memory having program instructions stored thereon that when executed by the computer device cause the system to perform operations comprising:
        receive a request from a user device, comprising a phone, for an item of primary streaming content and an identification of user device characteristics comprising display size data comprising display height and width in pixels;
        in response to the request for the item of primary content, stream the item of primary streaming content to the user device, wherein the item of primary streaming content is transcoded using a transcoding suitable for the display size of the user device;
        detect based at least in part on scheduling data and/or streamed tags, after at least a portion of the primary streaming content has been rendered on the user device comprising the phone using a first aspect ratio, streaming of secondary content to the user device;
        automatically transmit an instruction to the user device configured to cause the first aspect ratio to be changed to a second aspect ratio at least partly in response to detecting the streaming of secondary content based at least in part on scheduling data and/or streamed tags,
        wherein the second aspect ratio is configured to enable frames of the secondary content to be fully rendered on the user device, wherein tops, bottoms, and sides of the secondary content are not cut off or obscured;
        detect an end of the streaming of the secondary content based at least in part on one streamed tag; and
        at least partly in response to detecting the end of the streaming of the secondary content, cause the first aspect ratio to be restored.

2. The system as defined in claim 1, wherein detecting, after primary streaming content has been rendered on a user device using the first aspect ratio, streaming of secondary content to the user device, comprises detecting ID3 data associated with the streamed secondary content.

3. The system as defined in claim 1, wherein detecting, after primary streaming content has been rendered on a user device using the first aspect ratio, streaming of secondary content to the user device, comprises detecting a SCTE-35 signal associated with the streamed secondary content.

4. The system as defined in claim 1, wherein detecting, after primary streaming content has been rendered on a user device using the first aspect ratio, streaming of secondary content to the user device, comprises accessing timing information associated with the streamed secondary content.

5. The system as defined in claim 1, wherein automatically causing the first aspect ratio to be changed to the second aspect ratio at least partly in response to detecting the streaming of secondary content comprises performing an un-zoom operation equivalent to a tap command.

6. The system as defined in claim 1, wherein the primary streaming content is streamed from a different server then the secondary streaming content.

7. The system as defined in claim 1, wherein restoring the first aspect ratio further comprises accessing information identifying the first aspect ratio from memory.

8. The system as defined in claim 1, wherein the secondary streaming content comprises a sequence of items of secondary streaming content.

9. A computer implemented method, the method comprising:
   receiving at a streaming system configured to stream video content over a network to user devices a request from a user device, comprising a phone, for an item of primary streaming content and an identification of user device characteristics comprising display size data comprising display height and width in pixels;
   in response to the request for the item of primary streaming content, causing the item of primary streaming content to be streamed to the user device, wherein the item of primary streaming content is transcoded using a transcoding suitable for the display size of the user device;
   detecting by the streaming system based at least in part on a first streamed tag, after at least a portion of the item of primary streaming content has been rendered on a user device using a first aspect ratio, a streaming event of secondary content to the user device;
   enabling the first aspect ratio to be changed to a second aspect ratio at least partly in response to detecting the streaming event of secondary content to the user device,
   wherein the second aspect ratio is configured to enable frames of the secondary content to be fully rendered on the user device;
   detecting, by the streaming system, an end of the streaming of the secondary content based at least in part on a second streaming tag; and
   at least partly in response to detecting the end of the streaming of the secondary content, enabling the first aspect ratio to be restored.

10. The computer implemented method as defined in claim 9, wherein detecting, after primary streaming content has been rendered on a user device using the first aspect ratio, the streaming event of secondary content to the user device, comprises detecting ID3 data associated with the streamed secondary content.

11. The computer implemented method as defined in claim 9, wherein detecting, after primary streaming content has been rendered on a user device using the first aspect ratio, the streaming event of secondary content to the user device, comprises detecting a SCTE-35 signal associated with the streamed secondary content.

12. The computer implemented method as defined in claim 9, wherein detecting, after primary streaming content has been rendered on a user device using the first aspect ratio, the streaming event of secondary content to the user device, comprises accessing timing information associated with the streamed secondary content.

13. The computer implemented method as defined in claim 9, wherein changing from the first aspect ratio to the second aspect ratio comprises performing an un-zoom operation equivalent to a tap command.

14. The computer implemented method as defined in claim 9, wherein the primary streaming content is streamed from a different source then the secondary streaming content.

15. The computer implemented method as defined in claim 9, wherein enabling restoring the first aspect ratio further comprises accessing information identifying the first aspect ratio using data accessed from memory.

16. A non-transitory computer readable memory having program instructions stored thereon that when executed by a computing device cause the computing device to perform operations comprising:
   receive a request from a user device for an item of primary content streaming and an identification of user device characteristics comprising display size data comprising display height and width in pixels;
   in response to the request for the item of primary streaming content, cause the item of primary streaming content to be streamed to the user device, wherein the item of primary streaming content is transcoded using a transcoding suitable for the display size of the user device;
   detect, based at least in part on a first streamed tag, after at least a portion of the item of primary streaming content has been rendered on a user device using a first aspect ratio, a streaming event of secondary content with respect to the user device;
   enable the first aspect ratio to be changed to a second aspect ratio at least partly in response to detecting the streaming event of secondary content to the user device,
   wherein the second aspect ratio is configured to enable frames of the secondary content to be fully rendered on the user device;
   detect an end event of the streaming of the secondary content; and
   at least partly in response to detecting the end event of the streaming of the secondary content, enable the first aspect ratio to be restored.

17. The non-transitory computer readable memory as defined in claim 16, wherein detecting, after primary streaming content has been rendered on a user device using the first aspect ratio, the streaming event of secondary content to the user device, comprises detecting ID3 data associated with the streamed secondary content.

18. The non-transitory computer readable memory as defined in claim 16, wherein detecting, after primary streaming content has been rendered on a user device using the first aspect ratio, the streaming event of secondary content to the user device, comprises detecting an SCTE-35 signal associated with the streamed secondary content.

19. The non-transitory computer readable memory as defined in claim 16, wherein detecting, after primary streaming content has been rendered on a user device using the first aspect ratio, the streaming event of secondary content to the user device, comprises accessing scheduling information associated with the streamed secondary content.

20. The non-transitory computer readable memory as defined in claim 16, wherein changing from the first aspect ratio to the second aspect ratio comprises performing an un-zoom operation equivalent to a tap command.

21. The non-transitory computer readable memory as defined in claim 16, wherein the primary streaming content is streamed from a different source then the secondary streaming content.

22. The non-transitory computer readable memory as defined in claim 16, wherein enabling restoring the first aspect ratio further comprises accessing information identifying the first aspect ratio using data accessed from memory.

* * * * *